United States Patent Office 3,561,853
Patented Feb. 9, 1971

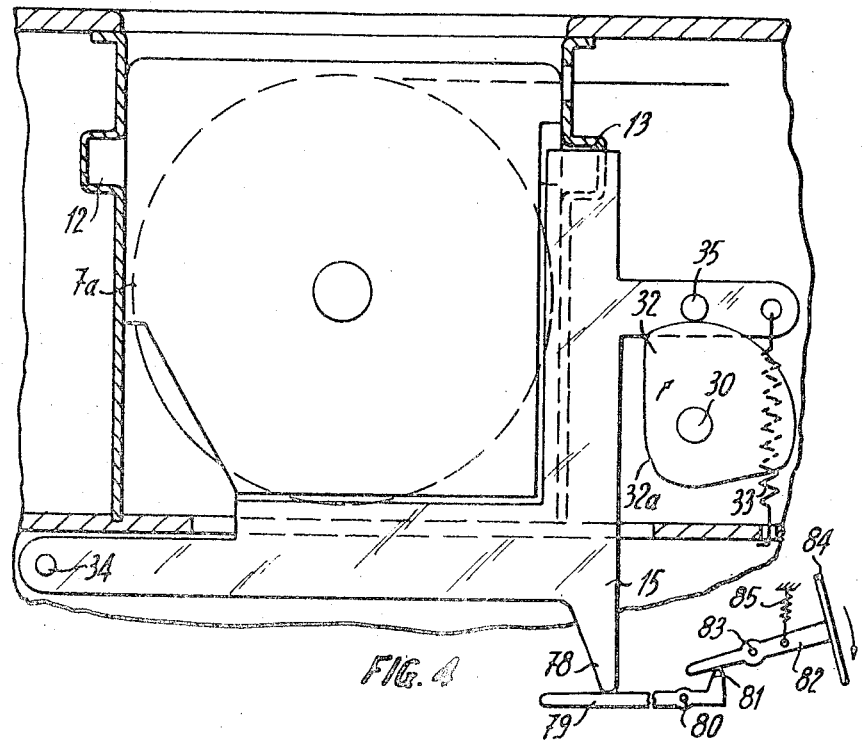
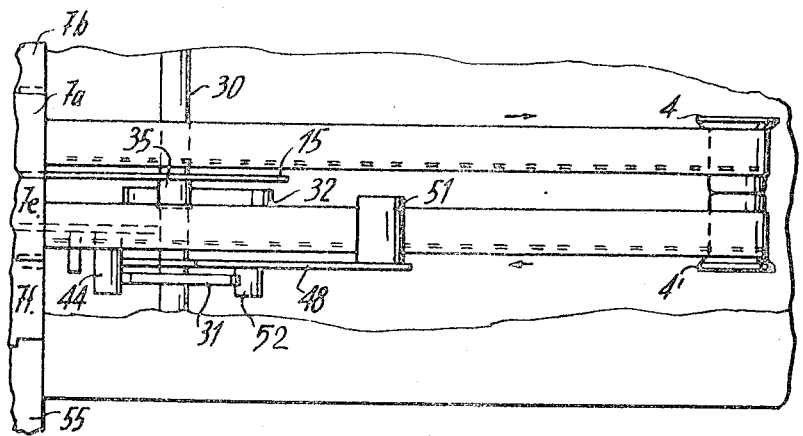

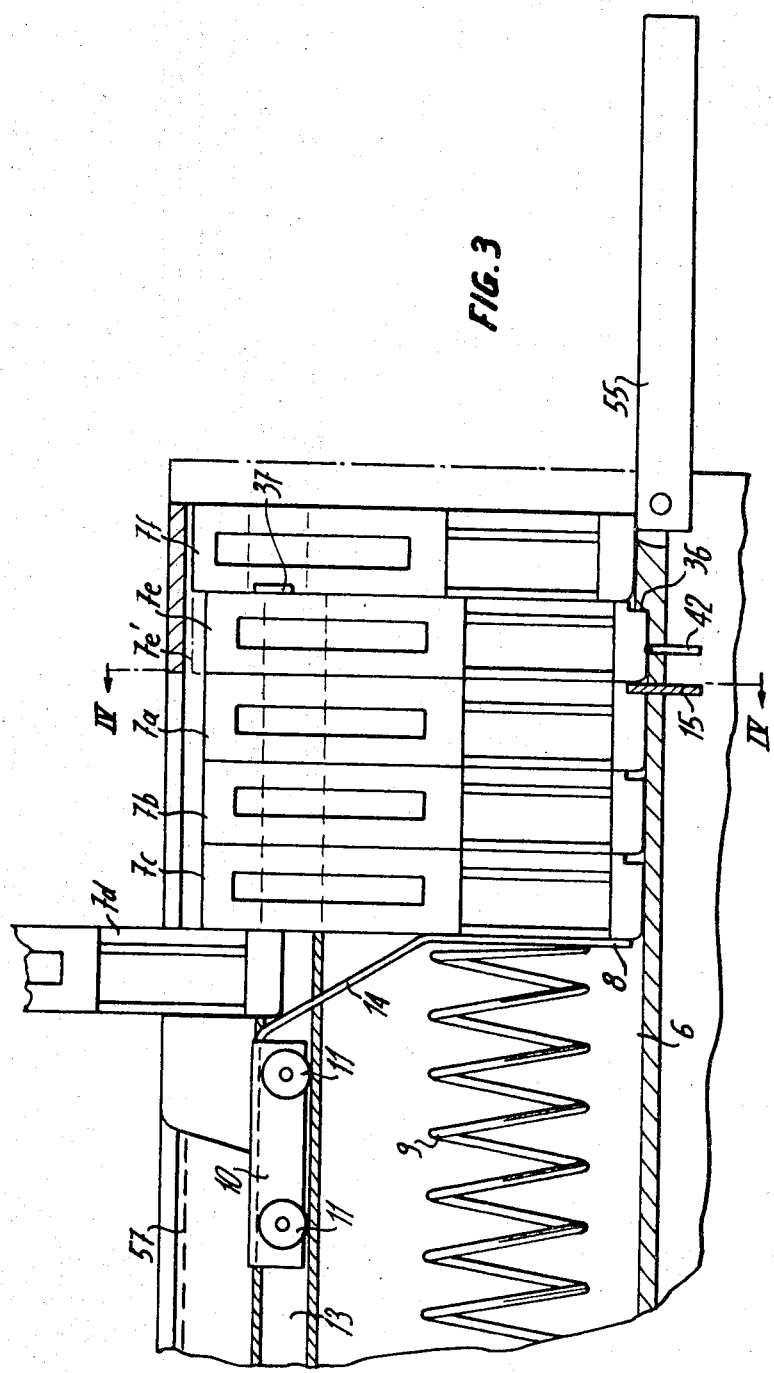

3,561,853
MOTION-PICTURE PROJECTOR FOR AUTOMATICALLY PROJECTING A SERIES OF FILMS IN CASSETTES
Louis Thevenaz, Vaud, Switzerland, assignor to Paillard S.A., Vaud, Switzerland, a company of Switzerland
Filed Oct. 29, 1968, Ser. No. 771,435
Claims priority, application Switzerland, Nov. 15, 1967, 15,996/67
Int. Cl. G03b 21/04
U.S. Cl. 352—123                14 Claims

ABSTRACT OF THE DISCLOSURE

A series of cams ensures the correct movement of a row of cassettes in the projector magazine, and the timed operation of levers, for automatically projecting a film while rewinding the previously projected film onto its spool in its cassette.

BACKGROUND OF THE INVENTION

Among the projectors of the prior art are those which the user can load with a number of reels of film, which are then automatically projected, one after the other.

In order to avoid the necessity of having as many film take-up means as there are reels of film to be projected, which would result in a projector of considerably greater size, it has been suggested that each film, immediately after it has been projected, should be rewound onto the same spool from which it was just unwound. In order to ensure the least possible delay between the end of the projection of one film and the beginning of the projection of the next, it has also been suggested that the first film should be rewound while the second is being projected. With a view to attaining this end using only a single film gate, a single projection lamp, and a single objective, it is necessary to provide means for moving sideways the film which has just been projected, so that the film gate is empty and can receive the next film. These means are described in the U.S. Pat. No. 3,342,541.

In the projector described in said patent, the reels of film are held in cassettes, or cartridges, having a hinged cover to which the film is attached. The user must open the cover of each cassette before he loads it into the projector, in order to ensure automatic projection.

There has also been suggested a system comprised of cassettes, holding spools of different capacities, and of projectors which can be loaded with a cassette of this kind, these cassettes incorporating means for guiding the outer end of the reeled film to leave the cassette, without the user having to open the cover or otherwise handle the cassette. These projectors, of course, have an arrangement for automatically threading the film, so that the user has very little to do.

SUMMARY OF THE INVENTION

The purpose of the invention is to permit the automatic consecutive projection of a number of films held in cassettes of the kind last described. The user does not have to open the covers of the cassettes before loading them into the projector. The threading of each film, and the rewinding of each film while the next one is being projected, occur automatically.

BRIEF DESCRIPTION OF THE DRAWING

The invention will be described, with reference to the figures of the drawing, wherein:

FIG. 2 is a top view, partly cut away;

FIG. 3 is a view, partly in section, taken along line III—III of FIG. 1;

FIG. 4 is a view, partly in section, taken along line IV—IV of FIG. 3;

DESCRIPTION OF THE PREFERRED EMBODIMENT

Figure 1:
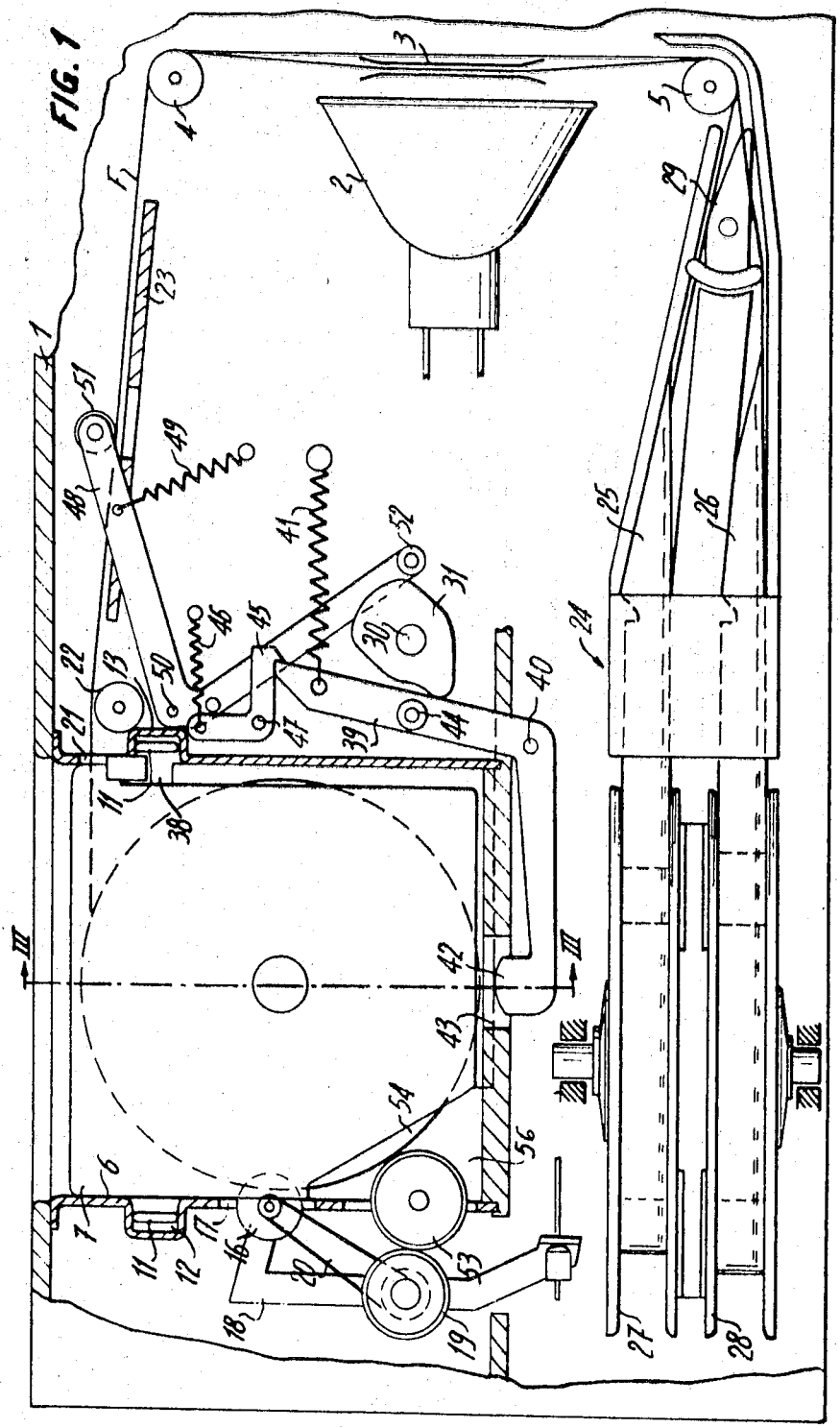
FIG. 1 is a side view, partly cut away and in section, of an embodiment of the invention.

The motion-picture projector comprises a case 1 enclosing all of the parts required for projecting a film F, a projection lamp 2, a film gate 3, and wheels 4 and 5 for guiding the film. The projector also incorporates an intermittent drive for advancing the film and an objective, both of which are not shown.

The projector also incorporates a channel-shaped magazine 6, which is open at the top of the case 1, for holding a number of film cassettes, or cartridges, 7, arranged transversely to the axis of the magazine space and placed side by side to form a row.

The magazine 6 incorporates a pusher 8 (see FIG. 3) biased by a compression spring 9 and guided by a runner 10 on wheels 11, which latter engage respective grooves 12 and 13, in the two opposed sides of the magazine 6. The pusher 8 also has an inclined surface 14, which facilitates the placing of cassettes into the magazine. To the runner 10 is attached the end of a curtain 57, which closes off that part of the magazine that has no cassettes. The runner 10 and the spring 9 are thus covered by the curtain, which can be semi-rigid, slidable, or a flexible band of fabric or synthetic plastic the other end of which is wound up on a spring-loaded drum, not shown.

As shown in FIG. 3, the cassette which is in the position 7a—the projection position— is supported against the force of the pusher spring 9 by a movable stop 15. The cassettes in the positions 7b and 7c, pushed on by the spring 9, press the cassette in the position 7a against the stop 15. The cassette in the position 7d is being loaded into the magazine, and presses, on the one hand, against the cassette in position 7c and, on the other hand, against the inclined surface 14. Thus, the projectionist can load simply by pushing a cassette into the magazine, whereby the pusher 8 is forced back against the bias of its spring 9.

When a cassette is in the position 7a, a wheel 16, the circumference of which is rubber covered, is moved to contact the outer spiral of the film in the cassette, the wheel projecting through an opening 17 in the magazine wall, and through an aligned opening (not shown) in the cassette. This movement is made possible by mounting the wheel 16 on an arm 18 free to pivot about the shaft of a drive wheel 19, the latter being rotated and transmitting its movement to the wheel 16 by a belt 20. The wheel 16, therefore, drives the reel of film in the cassette until the outer end of the reeled film strikes a deflector (not shown), in the cassette, which moves the film towards a film outlet opening 21 of the cassette. The film is then moved by a wheel 22 towards a guide path 23, the wheel 4, the film gate 3, the wheel 5, and a film take-up means 24, which latter comprises two passageways 25 and 26, each leading to a respective take-up spool 27 and 28. After the film has passed under the wheel 5, its end is deflected to one or the other of the passageways 25 and 26 by a pivotal deflector 29.

Figure 5:
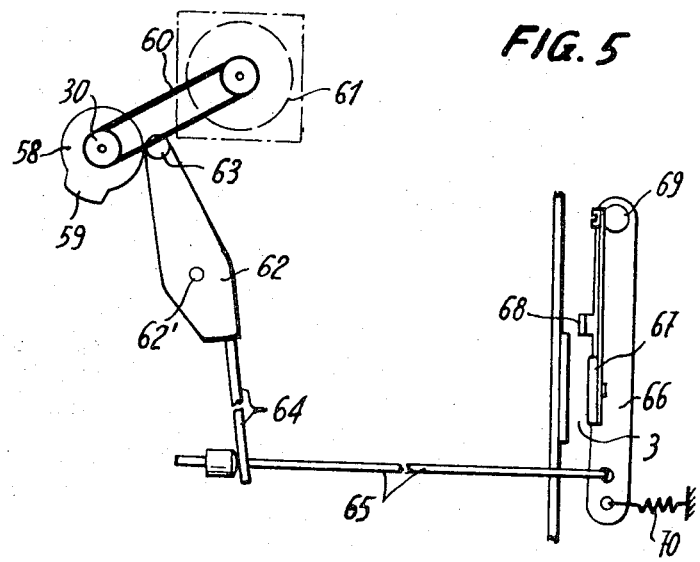
FIG. 5 shows the film gate control.

When the film contained in the cassette in the position 7a has been completely projected, means, not shown, are operated. These means, for example, can be responsive to the tension in the film caused by the drive arrangement, as a consequence of the fact that the inner end of the film is firmly held by the spool in the cassette. These means turn on a motor 61 (see FIG. 5), which drives a belt 60, causing one complete revolution of a shaft 30 that carries a cam 31 (see FIG. 1), a cam 32 (see FIG. 4), a cam 58 (see FIG. 5), and a cam 71 (see FIG. 6). The cam 32 acts on the movable stop 15, which holds a cassette in the position 7a. This movable stop embodies a projection 78 pressing against a lever 79 pivoting on an axle 80. The end 81 of this lever cooperates with another lever 82 carrying means 84 for blocking or attenuating the light beam from the projection lamp 2.

The cam 32 holds the movable stop 15 against the force of a tension spring 33 tending to cause the stop to pivot clockwise (as viewed in FIG. 4) about an axle 34. When the cam 32 turns (in the direction of the arrow), the part 32a of the cam, having a smaller diameter, permits the support wheel 35, carried by the stop 15, to lower, and the stop, under the action of the spring 33, to pivot until it is out of the magazine 6. Since the cassette in the position 7a is no longer held, the entire row of cassettes is pushed rightwards (as seen in FIG. 3) by the spring 9, until the cassette which contained the film just projected strikes a shoulder 36 and a fixed stop 37 which projects within the magazine 6. The position now occupied by this cassette is 7e. In order to move from this position to leave the magazine, the cassette must be raised so that its lower edge clears the shoulder 36 and the fixed stop 37 is aligned with a slot 38 provided in each cassette.

The apparatus for raising the cassette from position 7e to 7e' is shown in FIG. 1. It comprises a lever 39 mounted on a pivot 40 and biased by a tension spring 41. This lever incorporates a head 42 which can pass through a magazine opening 43 to push against a cassette in position 7e, and a wheel 44 that cooperates with the cam 31. The lever 39 is held in its inactive position, shown in FIG. 1, against the force of its spring 41, by a locking lever 45 biased by a tension spring 46 and pivoted at 47. The apparatus also comprises a feeler lever 48 biased by a spring 49 and pivoted at 50. This lever carries a wheel 51 that cooperates with the film F in the guide path 23 and another wheel 52 cooperating with the cam 31.

The projected film is rewound onto the spool in the cassette in position 7e by means of a wheel 53 with a rubber circumference, the wheel being driven by the drive wheel 19 and contacting the edge of the flange of the bobbin 54 in the cassette, through an opening 56 in the cassette.

The cam 58, embodying a boss 59 and carried by the shaft 30, operates the film gate 3, in particular, the pressure plate 67 and the film pull back 68. This cam acts on a lever 62, which is pivoted at 62', and carries at one end a wheel 63 and at its other end a rod 64. A further rod 65 is fixed, on the one hand, to the rod 64 and, on the other hand, to a movable arm 66, which latter pivots at 69 and carries the pressure plate 67 and the pull back 68. A return spring 70 causes the arm 66 to resist, but not to prevent, the movements of the rod 65.

Figure 6:
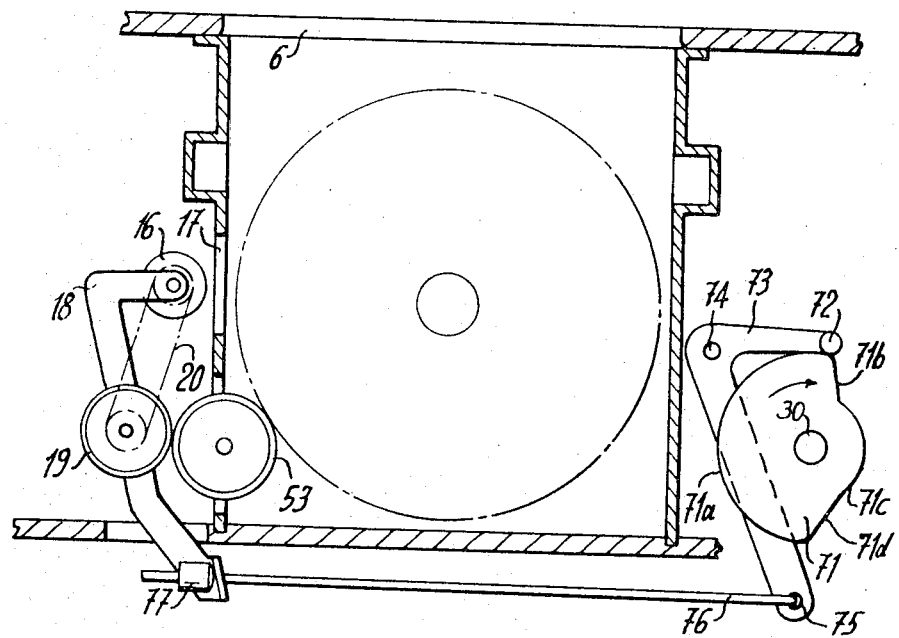
FIG. 6 shows the spool drive arrangement.

The arm 18, carrying the wheel 16 for moving the film end to the cassette opening, is pivoted by the cam 71 on the shaft 30, as seen in FIG. 6. This cam embodies two circular portions 71a and 71c joined by two inclined surfaces 71b and 71d, and acts on a boss 72 of a lever 73 pivoting at 74. A rod 76 engages a hole 75 in the lever 73 and is connected to the arm 18 by a stop 77 fixedly mounted on the latter.

The invention operates in the following manner. The cassettes are loaded in the magazine 6 in the order in which the films therein are to be projected. These cassettes occupy the positions 7a, 7b, and 7c, illustrated in FIG. 3, the positions 7e and 7f being empty. The projector is started up by operating a switch, not shown; the wheels 16 and 53 are thereby rotated. The wheel 16 enters the cassette in position 7a through the cassette opening 17.

The movement of the wheel 16 through the opening 17 is controlled by the cam 71 (see FIG. 6). As soon as the shaft 30 begins to turn, the boss 72 no longer contacts the circular cam portion 71a and instead engages the inclined surface 71b. The lever 73 pivots at 74 and pushes the rod 76 leftwards (as viewed in FIG. 6), causing the arm 18 to pivot clockwise and to move the wheel 16 against the film, which is unwound in the cassette in position 7a and moved towards the automatic threading arrangement, previously mentioned.

In the film projection position, the cam 58 is stopped in a position in which the boss 59 (see FIG. 5) pushes against the wheel 63. In this position, the rod 65 pivots the arm 66 against the force of the tension spring 70, so that the pressure plate 67 is closed.

When changing films, the rotation of the cam 58 causes the lever 62 to pivot counterclockwise, moving the rod 65 to the right and thus opening up the pressure plate 67. Simultaneously, the film pull back 67 frees the film F from the advancing claw and the means for guiding the film in the gate 3.

After the film is changed, the cam shaft 30 is stopped at its starting position, at which the cam 58 moves the pressure plate 67 to close the gate 3, the cams 71 and 31 respectively hold the driven wheel 16 and the lever 39 in their inactive position, and the cam 32 holds the stop 15 in its raised position.

When the film has been completely projected, means, not illustrated, automatically stop the projection mechanism. Since the film just projected must next be rewound into its cassette, the inner end of the film can be securely attached to the spool hub in the cassette, so that when the film is completely unwound it is subjected to a greater than ordinary tension, which can be used to indicate the end of, and to stop, the projection.

When the projection at the end of a film is stopped, the shaft 30 is automatically set into rotation, turning clockwise, as viewed in FIGS. 1, 4, 5, and 6. At the beginning of this rotation, the cam 31 acts on the wheel 52, causing the lever 48 to pivot, whereby the wheel 51 is moved away from the guide path 37. While one part of the cam 31 is cooperating with the wheel 52, another part of this cam pushes on the wheel 44, causing the lever 39 to occupy the position illustrated in FIG. 1, provided that it has been previously freed by the locking lever 45. The cam 32, turning, of course, at the same time that the cam 31 does, next frees the wheel 35 of the movable stop 15, so that the spring 33 causes the stop to pivot out of the magazine 6. The cassette which is in the position 7a is now free to move, under the force of the spring 9, against the shoulder 36 and to occupy the position 7e, which is the rewinding position.

As the stop 15 pivots, the projection 78 causes a lever 79 to turn about the axle 80, the lever end 81 pressing against the lever 82 carrying the means 84 for controlling the light from the lamp 2. The purpose of this means, which can be a light attenuating filter, is to block the beam from the projection lamp 2, in order to prevent projection, onto the screen, while the film is being moved sideways at the end of the projection of each reel. A tension spring 85 holds the means 84 out of the light path during projection of a film.

As the cassettes advance to the right (as seen in FIG. 3), the film F which has just been unwound out of the cassette projected, but the end of which remains fixed to the hub of the spool in this cassette, is moved sideways in the film gate 3, as well as in that one of the two passageways 25 and 26 through which it passes. In order to permit this lateral movement, the pressure plate 67 of the film gate 3 is opened by the mechanism previously described. When the cam 58 rotates so that the wheel 63 now rides on its circular portion, the lever 62 pivots, moving the pressure plate 67 to open the gate 3, the gate being held open by the return spring 70.

The movement of the arm 66, mounting both the pressure plate 67 and the film pull back 68, also moves the latter so that the film is freed from the advancing mechanism, not shown.

The passages 25 and 26 are open on one side. When the film is moved sideways, it presses against the deflector 29, acting as a shunt in the entrance to the passages 25 and 26, and moves it to that position in which it deflects the next film into that one of the passages which is free, as described in the U.S. patent application No. 743,849, filed on July 10, 1968, of the same applicant.

When the film F moves sideways it slides over the wheels 4 and 5, and comes to rest on the wheels 4' and 5' which are coaxial and adjacent to these wheels. Only the wheel 4' is shown (see FIG. 2). The sideways movement of the film is not hindered by the wheel 51, because it has been previously raised by the cam 31.

When the shaft 30 has completed one turn, it stops and the cams occupy the positions shown in the figures. The apparatus is now ready to project the next film, the cassette of which has been advanced to the position 7a. As the next film is being shown, the spool of the cassette in the position 7e is in position to be rewound. The spool is rotated by the wheel 53 running on the rim of its flange; and the film is rewound onto the spool at a relatively slow speed, while the next film is being projected. The rewinding speed, however, is a little gerater than the projection speed. Once the film end has passed through the guide path 23, the film F no longer supports the wheel 51. The lever 48 is free, therefore, to turn under the force of its spring 49, causing the locking lever 45 to pivot and thereby freeing the lever 39, of which the head 42 lifts the cassette to the position 7e' (see FIG. 3), moving the spool 54 therein away from the rewinding drive wheel 53. At the moment at which the end of the film passes under the wheel 51 the rewinding is not quite finished, but because of the reaction time of the levers 48, 45, and 39, which latter move one after the other under the force of their respective springs, the spool 54 is not actually disengaged from the wheel 53 before the end of the film has entered the cassette in the position 7e.

The cassette remains in the raised position 7e' until the film in the cassette in the position 7a has been completely projected, whereupon the shaft 30 again undergoes a complete rotation; and the operations just described for changing films are repeated.

The cassettes which successively occupy the positions 7e, 7e', and 7f are then free to move onto a hinged cover 55, from where they are easily removed.

As is apparent from the preceding explanation, the projector of the invention can operate continuously, because fresh cassettes can be loaded into the magazine 6, while projecting, and the cassettes pushed onto the cover 55 can be removed.

Although the preferred embodiment of the invention has been described, the scope of, and the breadth of protection afforded to, the invention are limited solely by the appended claims.

What is claimed is:

1. In a motion picture projector for projecting a film reeled in a cassette and for immediately afterwards rewinding the film into the same cassette, and having means for automatically threading film contained in a cassette, an improvement which comprises a channel-shaped magazine with an open side and defining an axis for holding a plurality of cassettes positioned side by side so as to form a row which is guided by said magazine, a pusher contacting one end of the row for moving the same whereby each cassette in turn is movable into a projection position in which the film is projected and into a rewinding position in which the film just projected is rewound into its respective cassette, elastic means acting on said pusher to press the latter against the row of cassettes, and stop means for holding in place a cassette in the projection position and operable to permit the shifting of the row of cassettes step by step.

2. The projector as defined in claim 1, including a surface, inclined with respect to the magazine axis, incorporated by said pusher, said surface extending towards said open magazine side and diverging from the cassette row, whereby said pusher is moved against the force of said elastic means when a cassette is loaded into said magazine.

3. The projector as defined in claim 2, wherein said magazine incorporates two opposed sides extending parallel to the magazine axis, and a groove in each of said two sides for guiding the movement of said pusher.

4. The projector as defined in claim 1, wherein said stop means includes a stop in one side of said magazine for cooperating with one side of a cassette to stop the latter at the rewinding position into which it has just been moved, and means for moving the cassette to free it from said stop when rewinding is finished, whereby the cassette thus moved is free to move in the direction of movement caused by said pusher.

5. The projector as defined in claim 4, wherein said stop is a shoulder and said means for freeing the cassette therefrom is a first lever for moving the cassette transversely to the magazine axis when rewinding is finished.

6. The projector as defined in claim 5, including a movable feeler for operating said first lever, said feeler being supported by the film being rewound and moving when the film is nearly all rewound and is no longer present to support said feeler.

7. The projector as defined in claim 1, wherein said stop means includes a movable stop for moving between an active position, in which it projects into said magazine to cooperate with a side of a cassette to hold the latter in the projection position into which it has just been moved, and an inactive position, in which it does not cooperate with the cassette side.

8. The projector as defined in claim 5, including a first driven wheel for contacting and rotating the spool contained in the cassette in the rewinding position and for not contacting the spool when the cassette is moved by said first lever.

9. The projector as defined in claim 1, including movable means for interrupting the projection beam while reels are being changed, and means for opening the film gate of the projector while reels are being changed.

10. The projector as defined in claim 6, wherein said stop is movable between an active position, in which it projects into said magazine to cooperate with a side of a cassette to hold the latter in the projection position into which it has just been moved, and an inactive position, in which it does not cooperate with the cassette side, and including a cam shaft driven to complete one turn between the projection of successive reels of film, a first cam on said shaft for operating said movable stop to move the latter between its active and inactive positions, whereby said movable stop is held in its active position during projection and is moved to its inactive position when the projection is over so as to permit said pusher to move the cassette row, and therefore to move the cassette of the film just projected from the projection position into the rewinding position, when the cassette in the latter position is freed from said shoulder by said first lever, a return spring biasing said first lever to its active position in which the cassette in the rewinding position is freed from said shoulder, a locking lever for locking said first lever in an inactive position and operated by said feeler to free said first lever when said feeler is not supported by film being rewound, and a second cam on said shaft for moving said first lever to its inactive position against the force of said return spring when said first lever is not locked.

11. The projector as defined in claim 10, including a first driven wheel for contacting and rotating the spool contained in the cassette in the rewinding position and for not contacting the spool when the cassette is moved by said first lever, movable means for interrupting the projection beam while reels are being changed, a second lever for opening the film gate of the projector while reels are being changed and then closing the gate for projection, a third cam on said shaft for operating said second lever, a second driven wheel movable between active and inactive positions for turning, in its active position, the reel of film of the cassette in the projection position at the start of projection to ensure automatic threading, and a fourth cam on said shaft for moving said second driven wheel between its active and inactive positions.

12. The projector as defined in claim 11, wherein said movable means for interrupting the projection beam is movable between an active position, in which it interrupts the beam, and an inactive position, and including means for causing said movable means to move between its active and inactive positions in response to the movement of said movable stop between its inactive and active positions.

13. The projector as defined in claim 11, wherein the film just projected remains attached to its supply spool, and including means for causing said feeler to be operated by said second cam to be moved, when said feeler is no longer supported by film being rewound, back to a position in which the film just projected is free to move with respect to said feeler into the rewinding position for again supporting said feeler, and wherein said second cam while thus operating said feeler also moves said first lever against the force of said return spring, whereby the movement of said feeler caused by said second cam also moves said locking lever into position for again locking said first lever.

14. The projector as defined in claim 7, including a driven wheel positioned partly within said magazine for contacting the flange rim of the spool in the cassette in the rewinding position to effect rewinding and for not contacting the spool when the cassette is moved by said movable stop.

References Cited
UNITED STATES PATENTS

| | | | |
|---|---|---|---|
| 2,634,653 | 4/1953 | Barth | 353—113 |
| 2,755,030 | 7/1956 | D'ornellas | 252—123 |
| 3,342,541 | 9/1967 | Mouissie et al. | 352—123 |
| 3,463,580 | 8/1969 | Freudenschusz | 352—72 |
| 3,472,579 | 10/1969 | Schwarz | 352—6 |

S. CLEMENT SWISHER, Primary Examiner

U.S. Cl. X.R.

352—125